United States Patent
Nculing

[19]

[11] Patent Number: 6,149,341

[45] Date of Patent: *Nov. 21, 2000

[54] ARTICULATED TRACTOR-PAINT STRIPER FOR TWO-LAYER STRIPING

[76] Inventor: William V. Nculing, 4700 St. Johns Rd., Greenville, Ind. 47124

[*] Notice: This patent is subject to a terminal disclaimer.

[21] Appl. No.: 09/391,603

[22] Filed: Sep. 7, 1999

Related U.S. Application Data

[63] Continuation-in-part of application No. 08/647,597, Mar. 13, 1996, Pat. No. 5,718,534, and a division of application No. 08/912,779, Aug. 18, 1997, Pat. No. 5,027,281.

[51] Int. Cl.[7] .................................................. E01C 23/22
[52] U.S. Cl. ............................... 404/75; 280/400; 404/94
[58] Field of Search ........................ 404/94, 75; 180/11, 180/326; 280/327, 400

[56] References Cited

U.S. PATENT DOCUMENTS

| | | |
|---|---|---|
| 3,101,175 | 8/1963 | Brown . |
| 3,286,928 | 11/1966 | Mitchell . |
| 3,414,072 | 12/1968 | Hodges, Jr. et al. . |
| 3,540,358 | 11/1970 | Oakley ......................................... 94/39 |
| 4,514,967 | 5/1985 | Scanlan et al. ........................... 56/14.7 |
| 4,856,931 | 8/1989 | Bollag ........................................ 404/75 |
| 4,861,190 | 8/1989 | Glassel ...................................... 404/93 |
| 5,052,854 | 10/1991 | Correa et al. ............................. 404/94 |
| 5,203,923 | 4/1993 | Hartman ................................... 118/669 |
| 5,413,364 | 5/1995 | Hafendorfer .......................... 280/32.7 |
| 5,718,534 | 2/1998 | Neulilng ..................................... 404/94 |
| 5,882,020 | 3/1999 | Velke ...................................... 280/32.7 |
| 5,947,637 | 9/1999 | Neuling ..................................... 404/94 |

*Primary Examiner*—James A. Lisehora
*Attorney, Agent, or Firm*—Laurence Brown & Associates, P.C.

[57] ABSTRACT

This invention provides for painting a second coat upon a set of parallel striped lines in exact registration in one pass of a motorized painting vehicle for such applications as painting aircraft taxi stripes at airports. Beads are also registered on one of the lines in the same pass. Provisions are made for maintaining registration about curved lines by steering around curves with a shortened wheelbase vehicle and by extending paint nozzles for striping a plurality of parallel lines, typically a center twelve inch wide yellow line between two six inch wide black lines, outboard from one side of the painting vehicle. The vehicle comprises two four wheeled units articulated together by a universal articulation joint permitting vertical articulation so that the leading and trailing wheels may be lifted off the ground to reduce the wheelbase for steering around curves. Balance for articulation is established by paint tanks being moved forward and rearward on the two units for starting balance, with dynamic balance being retained by feeding equal weights of beads and paints respectively from the front and rear unit tanks. The rear unit contains a transaxle drive unit with constant torque drive for maintaining a straight line without operator steering. With this striper system the closedown time at airports for striping runways is reduced significantly at great savings.

8 Claims, 4 Drawing Sheets

ARTICULATED TRACTOR-PAINT STRIPER FOR TWO-LAYER STRIPING

This is a continuation-in-part of my patent application Ser. No. 08/647,597 Filed Mar. 13, 1996 for REAR DRIVE RIDEON TRACTOR UNIT FOR PROPELLING STEERABLE UTILITY VEHICLES SUCH AS WALK-BEHIND PAINT STRIPERS, now U.S. Pat. No. 5,718,534, Feb. 17, 1998, and is a division of application Ser. No. 08/912,779, now U.S. Pat. No. 6,027,281, filed Aug. 18, 1997 for ARTICULATED TRACTOR PAINT STRIPER SYSTEM FOR TWO-LAYER STRIPING.

TECHNICAL FIELD

This invention relates to a motorized mobile stripe painting system for superimposing a second layer stripe of paint precisely in registration upon a first stripe pattern over straight and curved line patterns with a single painting vehicle pass and more particularly it relates to articulated striper vehicles for painting striped lines propelled by a rear drive, ride-on tractor powered unit articulated to a leading manually steerable unit.

BACKGROUND ART

For airport runways, rigid specifications require paint stripes with two layers of paint, where a first set of parallel stripes is precisely laid down over both straight and curved striping patterns and the second paint layer has to register upon the first stripe within very tight tolerances. This leads to considerable registration and alignment problems with prior art equipment. With walk-behind hand steered striper units it takes unusual manual skill to make the long straight lines for airport runway without wavering from strict tolerances. It is even more difficult to precisely over paint a first stripe with a second coat and track closely over both straight lines and curves defining aircraft taxi line paths. Furthermore walk-behind stripers are so slow that the cost for an airport to be closed for striping is excessive.

Motorized painters conveyed on trucks, for example, may be fast and might be used for single line highway striping, but it is not feasible to use them at high travel speeds for registering a second stripe coat precisely over a first stripe coat, as required by airport specifications. Furthermore there are even more significant problems, for example in attempting to register parallel sets of stripes laid about curved paths, that are not resolved in the prior art.

Consider the critical timing factor of airport runway striping. Thus, the airports have to be shut down, so painting time is of the essence. Airport shutdown costs could reasonably run $10,000.00 an hour, for example. Thus, there has been no suitable way known in the prior art to both precisely meet stringent specifications for painting two coat stripes while significantly reducing the airport shutdown time involved.

In my parent application, I have introduced an advantageous manually manipulated, ride-on motorized stripe painting system that paints about five times faster than a walk-behind striper unit. This is an ideal speed for airport striping, where care must be taken to steer carefully along a pre-planned striping pathway. By articulating a push-tractor propeller unit to a manually steered paint striper unit carrying all the painting equipment, the system ideally paints both straight and curved line stripes. Of significant importance is the feature that the tractor drive transmission operates the striper in a straight line painting mode with hands-off manual steering to considerably reduce the skill of an operator necessary to paint long straight stripes such as necessary for airport runways.

Thus, it is an object of this invention to provide a new embodiment of articulated push-tractor striper assembly that is particularly adapted for striping airport runways.

It is another object of this invention to reduce the airport downtime necessary for painting.

A still further object of this invention is to provide a motorized striper vehicle that precisely tracks a first stripe paint coating to deposit a second coat of paint in register therewith.

Other objects, features and advantages of the invention will be found throughout the following description.

DESCRIPTION OF THE INVENTION

This invention incorporates by reference the disclosure of the parent application, now U.S. Pat. No. 5,718,534, which relates in more detail to the advantages and construction of rear-drive, ride-on tractor units articulated behind walk-behind paint striper units operable to lay down stripes with a single coat of paint.

This invention superimposes a second coat of paint precisely over the first stripe by a single pass of the painting system. To achieve this two paint striping units are articulated to form a striping vehicle operable so that the first coat is produced by the leading striper unit and the second coat by the trailing striper unit in a single pass of the vehicle. Thus, the rear-drive tractor unit is modified to become in addition to the propulsion unit a trailing striper unit for painting the second stripe coat in registration over the first stripe coat laid down by the leading striper unit. Thus, by painting both coats with a single pass of the articulated striper unit vehicle, the critical time of airport closing for paint striping on the runway is reduced at least in half because both coats of paint are deposited with a single pass of the vehicle.

Provisions are made in the resulting two-coat striper system for precise tracking of the second stripe layer in registration over the first stripe layer both for the long straight lines encountered on airport runways and associated curved lines typically required for aircraft taxi lines. This improved striper system incorporates features to resolve problems of (a) tracking sets of parallel stripes about curves; (b) painting long straight lines and (c) in superimposing a second coat exactly in registration upon a first stripe. Precise tracking in general is achieved by leading and trailing articulated four wheel painting units forming a vehicle which paints the initial striping paint coat from the leading striper unit, which is a walk-behind type of handlebar steered striper unit, and paints the second paint coat in registration over the initial striping layer at the trailing striping unit which comprises a rear-drive ride-on propulsion unit.

By employment of a three dimensional articulation joint between the leading and trailing units, typically a ball joint connector, the two units may articulate both horizontally and vertically. Since the painting operation is semi-automatic, for example steering along a straight line without hands-on, as it remains under control of an operator riding on the trailing tractor unit to employ a set of handlebars mounted on the leading unit for hands-on steering about curves and in a transport mode. In the steering mode, the frontmost and rearmost wheels are lifted off the ground to produce a short wheelbase with sharper turning radius. In this respect, the steering handlebars operate as a manual lever for depressing the articulation joint vertically enough to balance about the innermost wheel sets to lift both the frontmost two wheel set and rearmost two wheel set of an eight wheeled vehicle off the ground in a vertical articulation mode of operation. In effect the operator paints curved stripes in response to operator steering of the front unit by the handlebars with the frontmost and rearmost pairs of wheels off or nearly off the ground when a bit of controlled friction is desired.

There is a problem of tracking the units around curves to assure that the paint stripes are of proper width, spacing and precisely in registration when two or more parallel stripes are being deposited. By extending forward and rearward sets of striping nozzles away from one side of each of the articulated units, typically three stripes are painted comprising six inch width outer black stripes and a middle twelve inch yellow stripe. The shortened wheelbase steerable articulated painting system simply follows a painting pattern path and the stripes automatically track throughout any curved line portion of the striping pattern. For the straight line portion, the automatic straight line propulsion feature of this system keeps the striping straight without deviation even over long distances required in painting airport runways.

These and other features, advantages and embodiments of the invention will be described in more detail throughout the following drawings, specification and claims.

BRIEF DESCRIPTION OF THE DRAWINGS

In the accompanying drawings wherein like reference characters in the several views relate to similar features.

THE PREFERRED EMBODIMENT

Figure 1:
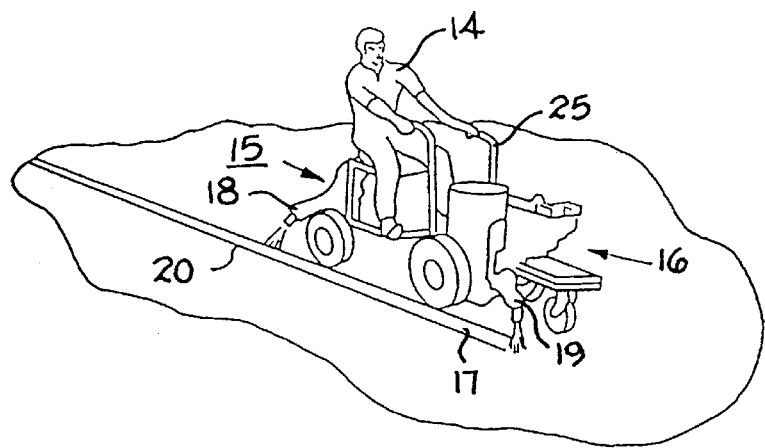
FIG. 1 is a perspective view of an articulated paint striper vehicle having a trailing tractor motor drive and striping unit upon which the operator is seated for manually steering a leading striping unit, which superimposes a second coating on the stripe during a single vehicle pass in accodance with this invention.

As may be seen in FIG. 1 this invention permits an operator 14 to ride on a rear motor drive tractor unit 15 articulated to a front paint striper unit 16 and steer the striping system by way of handlebars 25 on the front articulated unit 16 with good visual control over the striping 17 being laid down from the front paint gun 19. A second coating 20 is precisely laid down in registration with the stripe 17 from the rear paint gun 18 located on the trailing unit 15. As will hereinafter be shown, the system is supplied with features aiding the operator to provide precise control over straight and curved line striping of several parallel stripes producing first and second coats in the same pass of the striping vehicle.

Figure 2:
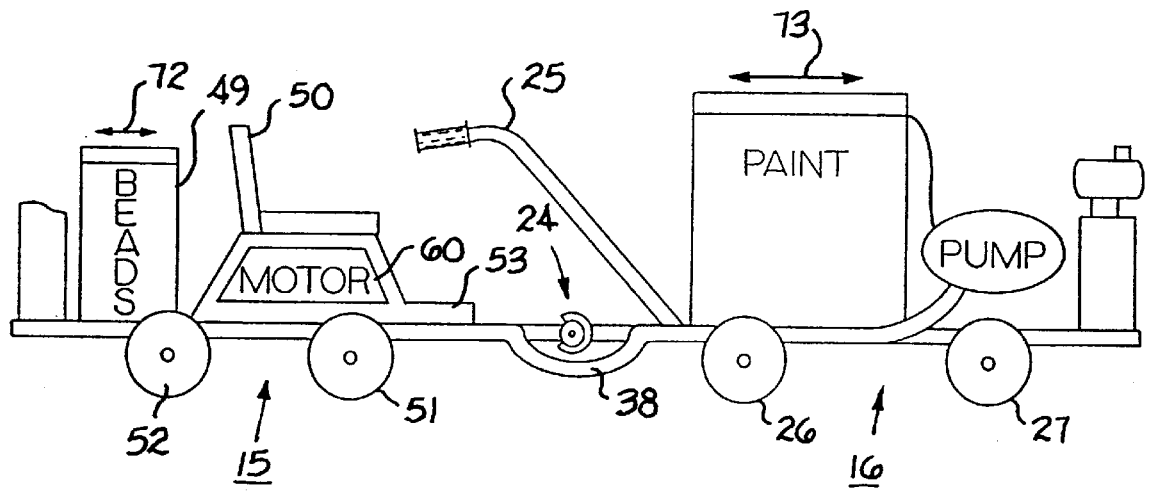
FIGS. 2 and 3 are respective side view and top view sketches of an embodiment of the articulated vehicle for producing a first stripe coating, a second stripe coating and a third glass bead coating in one pass.
Figure 3:
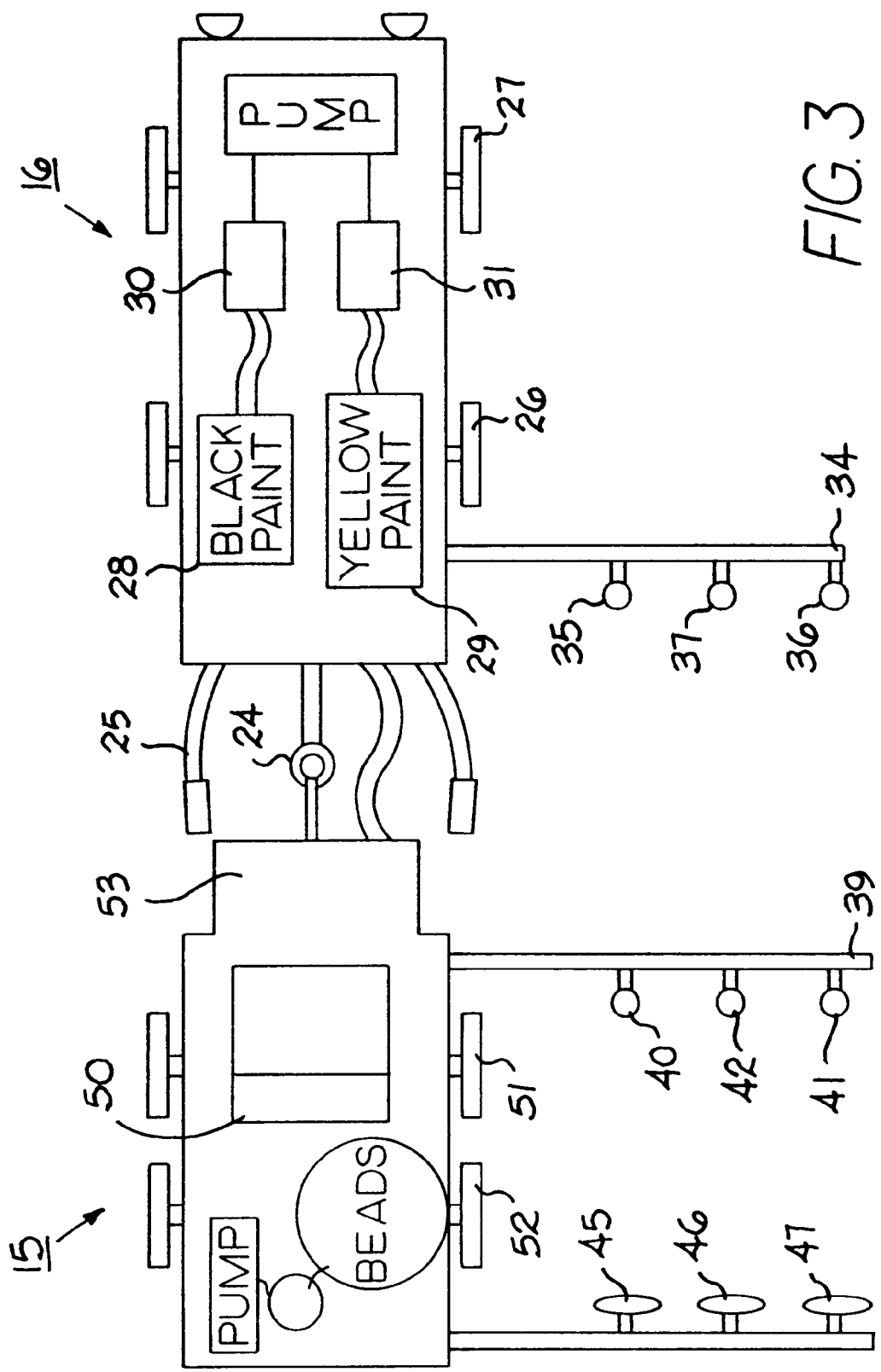

Now with reference to the striping vehicle embodiment of FIGS. 2 and 3, the two units 15 and 16 are articulated at the universal ball joint 24, which permits the units to articulate in both vertical and horizontal modes of operation. The leading paint striper unit 16 with the steering handlbars 25 has four wheels arranged in back and front wheel sets 26, 27. Two paint storage bins 28, 29 and corresponding paint dispensers 30, 31 permit the striper to paint in two different colors. Gun rack rod 34, which can extend laterally from either side of the unit, typically carries two outer paint guns 35, 36 for painting a pair of parallel six inch wide black stripes, alongside a twelve inch yellow stripe painted by the center paint gun 37. Thus, this striper can lay down a typical aircraft taxi line on an airport runway.

The trailing paint striper unit 15 carries a similar gun rack rod 39 with outer paint guns 40, 41 and center gun 42 in position for tracking with the three stripe line made by the front striper unit 16 to paint a second striping coat in exact registration with the first striping coat. The paint is supplied from the front striper unit 16 by way of the cable 38 connected between the leading and trailing striper units 16 and 15.

Furthermore, the trailing striper unit 15 carries a further gun rack rod 44, with aligned paint guns 45, 46, 47 for dispensing glass beads on the double coated stripe, as provided by the compressor assembly 48 for processing beads from the bead tank 49 carried on the trailing striper unit 15. Thus, the paint striper system in one pass of the vehicle puts down a first stripe, a second coat on the stripe, and beads, all in exact registration over eithe a straight or curved line path in a manner hereinafter shown to be made possible as a result of articulation of the units at the ball joint coupler 24.

Figure 4:
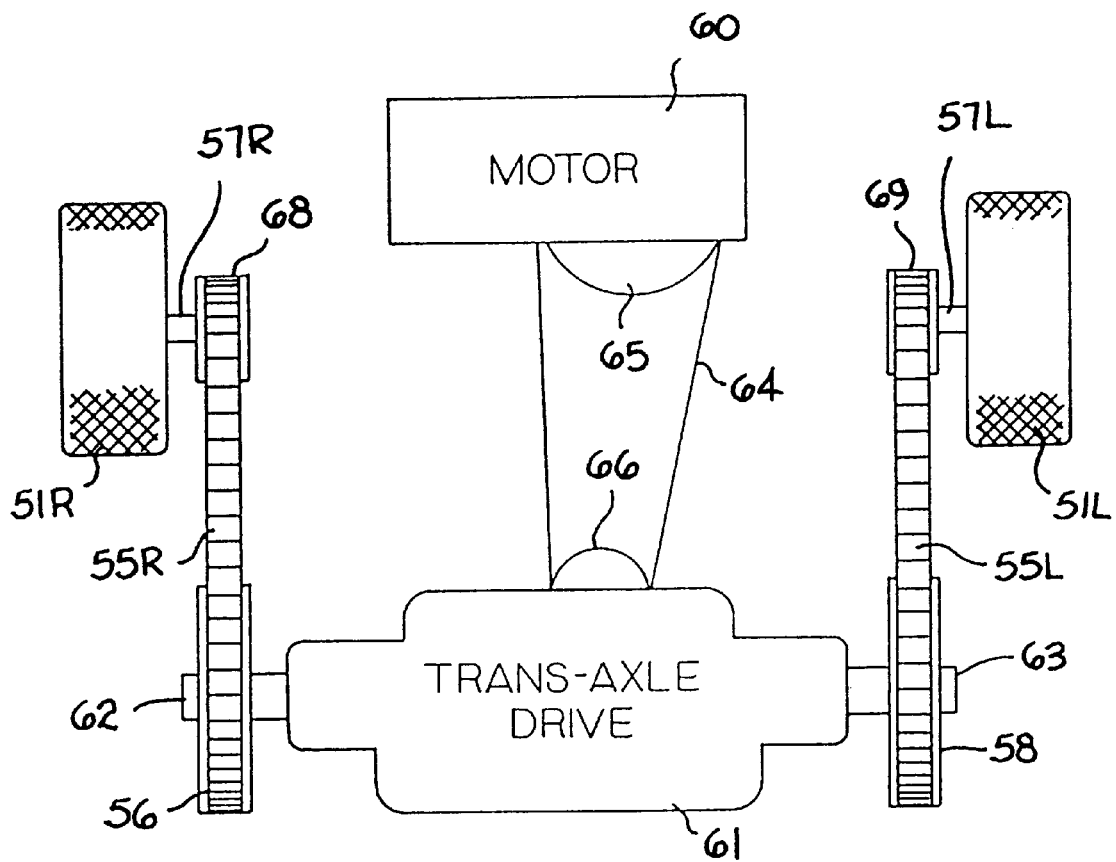
FIG. 4 is a schematic sketch of the equal torque drive system that permits the striper system to paint straight lines without hands-on steering by the operator.

The vehicle is powered by the motor 60 disposed under seat 50, where the operator sits to steer the vehicle by means of handlebars 25 with feet upon footrest 53. The drive wheel set 51 is nearest to the coupling joint 24 and is trailed by the rear wheel set 52 of the four wheel array. This provides an eight wheeled articulated vehicle that tracks a straight line precisely, particularly in view of the equal torque transmission employing the trans-axle drive array shown schematically in FIG. 4.

Thus the motor 60 is coupled by belt 64 from belt drive wheel 65 to the belt drive wheel 66 on the hydrostatic trans-axle transmission 61, with transaxles 62, 63 carrying the chain drive sprockets 56, 58. The drive chains 55R and 55L respectively couple the drive sprockets 56, 58 to the pinion gears 68 and 69 attached to the drive shafts 57R and 57L for the respective drive wheels 51R and 51L. This hydrostatic drive unit produces equal torque on both wheels 51R and 51L permitting the rear tractor unit 15 drive of the vehicle to steer the eight wheeled articulated vehicle in a straight line without manual steering force upon the handlebars 26. It would take considerable manual operator skill to steer such a vehicle in a perfectly straight line by the handlebars, without this equal torque drive feature.

Figure 5:
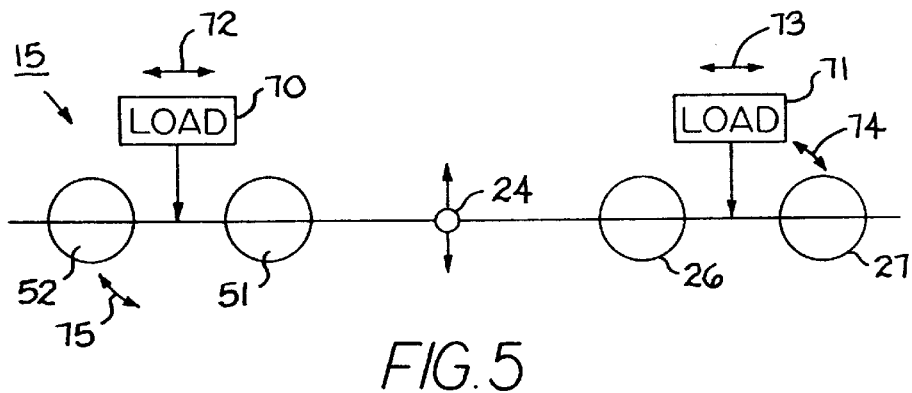
FIG. 5 is a schematic sketch depicting the operation of the striping system of this invention in response to a vertical mode of articulation afforded by the universal coupling joint between the two articulated striping units.

Now with reference to the schematic sketch of FIG. 5, the operation of the paint striping system in response to the vertical mode of articulation is discussed. The wheel sets 51, 52 of the trailing striper-drive unit 15 and the wheel sets 26, 27 of the leading striper unit 16 are respectively positioned on opposite sides of the universal articulation joint 24 from which the extending arrows indicate the vertical up-down degree of movement now to be discussed.

The respective loads 70 and 71 of the trailing unit 15 and leading unit 16 are schematically illustrated in block diagram form. The associated arrows 72, 73 indicate a horizontal degree of load movement afforded toward and away from the coupling joint 24, which is used to balance loads of the respective leading and trailing units about the innermost wheel sets 51, 26. When balanced it is easy for the operator by way of the handlebar 25 leverage to push the universal joint downwardly from its normal balanced operational position. This causes the leading wheels 27 and trailing wheels 52 to pivot upward about the intermediate wheel sets 26, 51 from full traction position as indicated respectively by arrows 74, 75. Thus, the operator by manual pressure upon the handlebar 25 lever converts from the straight line steering mode, which in essence is hands-off steering thanks to the equal torque drive transmission, into a manual steering mode for following a curved line striping path. This effectively shortens the wheel base of the vehicle to significantly reduce the turning radius. With this feature and the visibility for monitoring the striping pattern (FIG. 1), the operator may precisely follow a curved path for painting the stripes, and revert to hands-off steering when converting back to straight line striping. Also this manual mode of steering may be employed as a transport mode for moving the vehicle rapidly from place to place.

Now with reference to FIG. 2, the primary loading of the forward unit is in the paint storage tanks 29, (28) above which the arrow 73 indicates a fore and aft position balancing adjustment provided by means of a screw adjustment on a platform mount for the tanks, for example. Similarly for the trailing unit 15, the bead tank 49 is adjustable over a fore-aft balancing range 72 so that the units may be put in balance for initiating the normal striping operation. Furthermore a dynamic balance is maintained during the striping operation by drawing beads out of bead tank 49 in weight proportioned to the weight of paint drawn from the paint tanks 29, (28).

Figure 6:
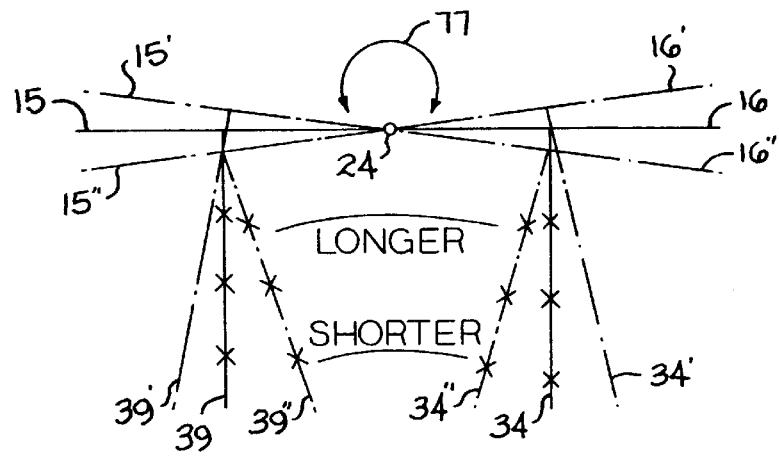
FIG. 6 is a schematic sketch depicting the operation of the striping system of this invention in response to a horizontal mode of articulation afforded from the universal coupling joint.

FIG. 6 schematically represents by the straight line 16 the leading unit articulated about universal joint 24 in the horizontal mode of articulation indicated by arrows 77. Similarly the trailing unit is represented by straight line 15. Extending perpendicularly from these units at equal distances from the articulation joint are the gun racks 34, 39. Two phantom views are superimposed to respectively represent the action of the gun racks 34, 39 as the vehicle is steered to articulate respectively upwardly or downwardly as shown in the sketch enabling the articulated vehicle to follow curved lines respectively along inner and outer arcs of the parallel stripe striping pattern.

It is thus seen by converging and diverging gun rack action that the striping system of this invention automatically shortens or lengthens stripes closest to the vehicle when tracking around curves. Thus, the second coating may be laid down precisely in registration over the first coating, to overcome the problems of shifting and skewed stripe dimensions including different lengths of line arcs for different stripes. With this automatic tracking feature, the shorter and longer painting paths the stripes take at the outer and inner radii of a curved path are automatically compensated for by the converging and expanding postures of the gun racks 34, 39 in the horizontal mode of articulation. Thus, it is seen for the articulated position 15', 16', the angle between the guns moves from parallel and diverge outwardly from the vehicle 15, 16. In this respect, the shorter paint lines over the arc of curvature are nearest the vehicle 15, 16. Likewise for the articulated position 15", 16", the angle converges. To paint the longer stripe paths closer to the vehicle in the arc of curvature.

Figure 7:
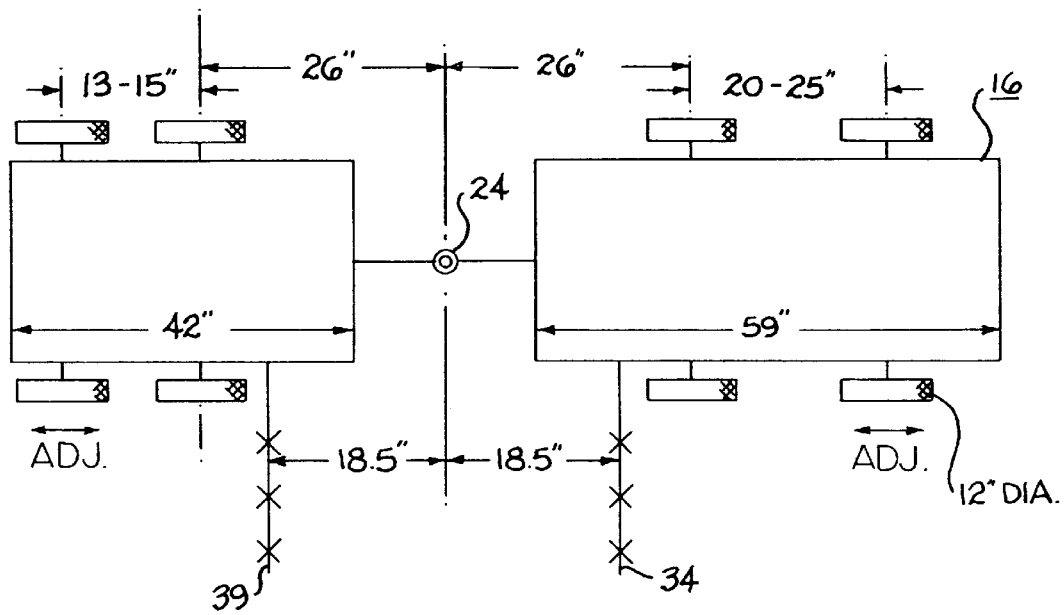
FIG. 7 is a schematic sketch of the striper system outlining typical dimensions for an embodiment of the invention especially suited for striping airport runways.

FIG. 7 diagrammatically sets out the relative dimensions of a vehicle operable in the fashion aforesaid to precisely register a second coat of paint over a first painted stripe pattern in a single pass of the articulated vehicle over curved paths. The performance of this vehicle meets the rigid specifications for registering the second coat in place precisely usually required for airport runway striping specifications in optimum time by laying down both paint coats with a single pass of the vehicle. In this respect it is seen that both the horizontal and vertical modes of articulation contribute to the ability of this vehicle to maneuver about the curved paths required in aircraft taxi lines.

Having therefore set forth the novel structure and operation of the improved striping system afforded by this invention, and having shown several features advancing the state of the art, those features of novelty describing the nature and spirit of the invention are set forth with particularity in the following claims.

What is claimed is:

1. A two coat paint striper system comprising in combination, a motorized vehicle carrying front end striping means positioning a first stripe painting device for painting a first stripe upon a surface to be painted as the vehicle travels along a stripe path of a width w in a paint striping direction and rear end striping means positioning a second stripe painting device for painting a second stripe of a width substantially identical to w precisely in registration upon the stripe being painted by the front end striping means as the rear end striping means carried by the travelling vehicle moves along the stripe path and articulation means for relatively correcting the positioning of the the first and second stripe painting devices as the vehicle travels around curves in a manner that avoids misregistration of the first and second stripes as the vehicle travels around curves.

2. The striper system defined in claim 1 wherein the vehicle comprises two articulated vehicular units respectively carrying said front end and rear end striping means.

3. The striper system defined in claim 2 wherein the units are articulated at a three dimensional articulating joint located between the two units.

4. The striper system defined in claim 2 wherein said front end and rear end striping means further comprise a gun bar extending from the side of each articulated unit, said bars each containing a plurality of striping guns for striping parallel sets of stripes, and said gun bars being spaced equal distances fore and aft from an articulating joint between the units operable in a manner that the outermost striping guns on the respective bars automatically diverge or converge as necessary to track with the length of the paint stripe required around a curved pathway being traversed by the vehicle.

5. The striper system defined in claim 2 further comprising a three-dimensional articulation member coupling the two articulated units together for movement in unison respectively in both vertical and horizontal components of articulation.

6. The striper system defined in claim 2 wherein both the front and rear end striping units respectively further comprise painting guns for painting parallel stripes respectively with first and second striping coats on a single pass of the vehicle.

7. The striper system defined in claim 2 further comprising gun rack means for extending painting nozzles for spraying stripes from respective ones of the articulated units with a leading set of spray nozzles being located forward of an articulation joint between the articulated units and the trailing set of spray nozzles being located behind the articulation joint for movement of the gun rack means in diverging and converting patterns over a curved stripe painting pathway.

8. The method of painting stripes upon a receptive surface from a motorized striper vehicle, comprising the steps of laying down a first paint stripe with a first painting device carried by said motorized striper vehicle when moving along a predetermined curved striping path on the surface, thereafter superimposing a second paint stripe with a second painting device carried by said motorized striper vehicle in precise registration upon the first paint stripe in the same pass of the motorized striper vehicle along said path by relatively moving the position of the two painting devices in a manner compensating for errors in tracking imposed by the path of the vehicle around the curves.

* * * * *